United States Patent [19]

Svoronos

[11] 4,331,636
[45] May 25, 1982

[54] METHOD OF PRODUCING PURE ALUMINA FROM ALUNITE

[75] Inventor: Jason Svoronos, Athens, Greece

[73] Assignee: Financial Mining-Industrial & Shipping Corporation, Athens, Greece

[21] Appl. No.: 87,775

[22] Filed: Oct. 24, 1979

Related U.S. Application Data

[63] Continuation of Ser. No. 726,554, Sep. 27, 1976, abandoned.

[30] Foreign Application Priority Data

Sep. 30, 1975 [GR] Greece ................................ 49019

[51] Int. Cl.³ .............................................. C01F 7/22
[52] U.S. Cl. ................................... 423/126; 423/132; 423/111; 423/82; 423/84
[58] Field of Search ............... 423/120, 122, 126, 127, 423/132, 82, 84

[56] References Cited

U.S. PATENT DOCUMENTS

| | | | |
|---|---|---|---|
| 1,214,991 | 2/1917 | Blough et al. | 423/120 |
| 1,301,394 | 4/1919 | Cross | 423/120 |
| 1,701,510 | 2/1929 | Sisurin | 423/126 |
| 2,413,709 | 1/1947 | Hoffman | 423/126 |
| 3,959,438 | 5/1976 | Messner | 423/132 |

FOREIGN PATENT DOCUMENTS

| | | | |
|---|---|---|---|
| 283497 | 2/1966 | Australia | 423/120 |
| 1667815 | 7/1973 | Fed. Rep. of Germany | 423/120 |

*Primary Examiner*—Herbert T. Carter
*Attorney, Agent, or Firm*—Watson, Cole, Grindle & Watson

[57] ABSTRACT

Pure alumina ($Al_2O_3$) is recovered from alunite ($Al_2(SO_4)_3 \cdot K_2SO_4 \cdot 4\,Al(OH)_3$) which is found mixed with various impurities by first calcinating the alunite in the presence of a chloride to produce impure $Al_2O_3$ and other biproducts, and the impure $Al_2O_3$ is then contacted with concentrated HCl to produce, after concentration and crystallization, crystals of $AlCl_3 \cdot 6H_2O$. These crystals are then calcinated to yield highly concentrated HCl and pure alumina.

7 Claims, No Drawings

METHOD OF PRODUCING PURE ALUMINA FROM ALUNITE

This application is continuation application of application Ser. No. 726,554, filed Sept. 27, 1976 now abandoned.

BACKGROUND OF THE INVENTION

1. Field of the Invention

The present invention is directed to the treatment of impure alunite in order to recover various chemical products therefrom, including pure alumina.

2. Description of the Prior Art

Much research has in the past been directed to the utilization of alumina-bearing minerals such as kaolinite, alunite, leucite, nephelite, muscovite, etc., since sufficient bauxite has not been available in the industrialized countries for the manufacture of alumina. Of these alumina-bearing minerals, the clays exist in abundance in practically all countries, while alunite, which is represented by the formula $Al_2(SO_4)_3 \cdot K_2SO_4 \cdot 4Al(OH)_3$, is available in large quantities in the United States, Greece, and other countries. In addition, alunite contains other valuable components, e.g., potassium sulfate ($K_2SO_4$) and sulfur trioxide ($SO_3$).

With respect to alunite, the most serious impediment to the production of pure alumina therefrom has always been its high content of sulfur trioxide ($SO_3$) which renders the application of alkaline methods of treatment (Bayer treatment, etc.) uneconomical. This is because the sulfur trioxide reacts with the alkali forming useless sodium sulfate ($Na_2SO_4$); in other words, high losses of both sulfur trioxide and alkali are caused.

Efforts in the past have been made to remove $SO_3$ from alunite prior to its treatment by alkaline methods. First of all, it was attempted to remove $SO_3$ by the calcination of alunite at about 900° C. by the following reaction (I):

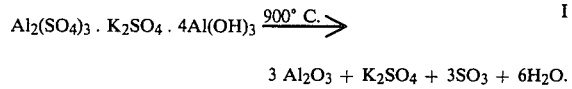

$$3 Al_2O_3 + K_2SO_4 + 3SO_3 + 6H_2O.$$

Thus, alumina ($Al_2O_3$) could be freed since the $SO_3$ and $H_2O$ formed sulfuric acid and the potassium sulfate ($K_2SO_4$), being chemically free, could be dissolved and extracted in hot water. However, alunite is never found in a pure state; on the contrary, it is accompanied by substantial amounts of foreign matter such as $SiO_2$, and these impurities remained in the washed residue of alumina after the removal of the filtrate containing the potassium sulfate. These silica and silica compound impurities rendered treatment and further purification of the produced alumina by alkaline methods uneconomical because the high temperature (900° C.) applied during the calcination reaction reduced the solubility of the produced alumina in caustic solutions such as NaOH. This necessitated the use of stringent purification conditions, i.e., extended digestion in high concentrations of alkali under high temperatures and pressures, which then caused the co-dissolution of the accompanying free or combined $SiO_2$.

Thus, it has been found that the contaminated alumina produced by the above reaction was of no higher value than white bauxite of high (and undesirable) $SiO_2$ content.

Better results were obtained when alunite was thermally broken down at a lower temperature (500°–590° C.) and with the addition of potassium chloride (KCl) or sodium chloride (NaCl) or a mixture of both according to the reaction (II):

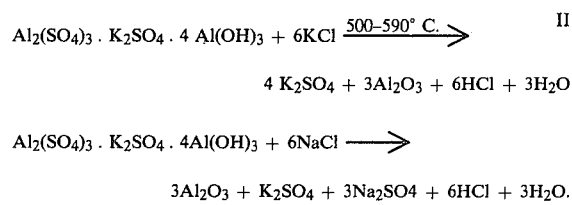

$$4 K_2SO_4 + 3Al_2O_3 + 6HCl + 3H_2O$$

$$Al_2(SO_4)_3 \cdot K_2SO_4 \cdot 4Al(OH)_3 + 6NaCl \longrightarrow$$

$$3Al_2O_3 + K_2SO_4 + 3Na_2SO_4 + 6HCl + 3H_2O.$$

The alumina produced by this reaction (II) was more soluble than the alumina produced at 900° C. (reaction I) and its dissolution in alkali could be effected under milder conditions, e.g., less concentrated solutions of NaOH, lower temperatures and use of atmospheric pressure. These conditions did not cause the undesirable dissolution of the free $SiO_2$. However, in actual practice, since the $SiO_2$ is rarely entirely free, but on the contrary a substantial portion of it is found combined with the alumina, consequently it would dissolve in the caustic solutions even under the milder conditions of concentration, temperature and pressure provided for by reaction (II).

Thus, this lower temperature method was successful only when the alunite was previously enriched to a purity of over 95% or when the accompanying gangue mineral consisted only of free, crystalline $SiO_2$.

The present invention solves these prior art problems by applying a new technique in purifying the impure alumina produced in accordance with reaction (II) known to the prior art.

SUMMARY OF THE INVENTION

The present invention produces pure alumina from impure alunite by treating the impure alumina produced by the calcination of impure alunite at temperatures below 590° C. and in the presence of chlorides, with concentrated HCl. Such pure alumina is free of the sodium oxide ($Na_2O$), potassium sulfate ($K_2SO_4$), silica ($SiO_2$), titanium dioxide ($TiO_2$) and HCl. The invention produces not only pure alumina but also concentrated HCl which can be used in various commercial applications.

DETAILED DESCRIPTION OF THE INVENTION

The present invention involves dissolving the alumina (as well as the possible accompanying aluminosilicate compounds) which is obtained by conventional reaction (II) in concentrated HCl. The alumina reacts with the HCl to form a high concentration solution of aluminum chloride ($AlCl_3$) and a residue of pure $SiO_2$ completely free of $Al_2O_3$, $Fe_2O_3$, $K_2O$, $Na_2O$, MgO, etc. The reaction sequences are:

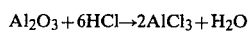

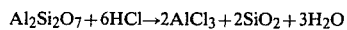

Thus, the only contaminant remaining with the pure silica is titanium dioxide ($TiO_2$) which can be suitably recovered. A suitable reaction temperature for the foregoing reaction sequences is between room temperature and 100° C., while a suitable HCl concentration is 30% or above. A specific reaction embodiment utilized 100° C. and HCl at a concentration of 37% or 23 Baume.

The aluminum chloride in solution form (with or without prior purification from Fe and other contaminants) is concentrated and crystallized into pure $AlCl_3.6H_2O$ crystals which, following their recovery and subsequent calcination, yield pure alumina and highly concentrated HCl. The alumina produced is free of $Na_2O$ which is always present in amounts of about 0.6% by weight of the alumina produced by the alkaline Bayer process. Such purified alumina is of high commercial value since purified grades of Bayer-process alumina which contain small quantities of $Na_2O$ impurity and which are of an excellent quality for refractory production (called "Medium Soda Content Alumina") commands a 20% or more price premium on the industrial market.

With regard to the highly concentrated HCl which is produced in substantial quantities, this reclaimed product is indispensable in certain industries, such as plastics manufacturing, and thus is marketable at premium prices. It is known that the concentration of HCl above its azeotropic composition is only indirectly achieved and is quite costly.

Thus, according to the present invention in the production of aluminum chloride and its decomposition not only is there achieved the purification of alumina, but there is also the indirect production of concentrated HCl from dilute HCl. Such concentrated HCl is then partly sold and partly employed to raise the concentration of 20% commercially available acid to 37% HCl which causes a better and quicker dissolution of alumina.

The present new method of alunite treatment and alumina recovery is novel, useful and economical. Furthermore, the chemical reactions associated therewith can be optimized in terms of reaction conditions in order to achieve their full potential, for example, it has been determined that use of a high calcination temperature of alunite and chloride salts is not necessary and in fact should not exceed 590° C. because then reaction (I) occurs rather than reaction (II), resulting in the production of hard-to-dissolve alumina.

Furthermore, it has been discovered that employing a mixture of KCl with about 1-10% NaCl improves and accelerates the reaction (II) without complicating the subsequent crystallization of $K_2SO_4$. Also, it has been determined that the use of commercially available HCl did not dissolve the alumina completely, but left 8-10% undissolved, thereby contaminating the silica in the residue. On the other hand, it has also been discovered that the use of concentrated acid which can be produced by mixing the original dilute acid with the highly concentrated HCl produced by the conversion of $AlCl_3$ to alumina according to the present invention secures the complete dissolution of the alumina.

The treatment of $Al_2O_3$ which is obtained from reaction (II) with HCl allows for the omission of pretreating the alunite which is employed in reaction (II) which would of necessity involve losses in values thereof, and substantial expenses for fine grinding, flotation reagents, concentrate washing, dewatering, etc.

When the alumina produced by reaction (II) is treated with HCl according to the present invention, then neither the enrichment of the alunite nor the realization of reaction (II) to over 90% of completion is necessary, although enrichment of the alunite ore can be utilized if desired.

Furthermore, the small percentage of unreacted alunite is also dissolved with HCl and the resulting small quantities of $K_2O$ and $SO_3$ thus dissolved in the $AlCl_3$ solution will be left in the mother liquor of the crystallized salt. For the same reasons, neither the dissolution of $K_2SO_4$ from the impure alumina is necessary to be completed through the removal of the last traces of $K_2SO_4$, nor must the impure alumina be filtered, dried and processed as a finished raw material for another industry (e.g., refractories industry). Instead, the alumina can be treated unprocessed with the HCl and is dissolved. Consequently, the applied reaction (II) in the first stage of treatment of alunite is the same as in other methods of treatment, but its industrial application is entirely different because there is no need for prior enrichment, quicker heating is achieved, and incomplete dissolution is utilized, etc.

In summation, the process of the present invention consists in the continuous steps as follows:
(a) The enrichment of alunite only when it is proved economical.
(b) The calcination of alunite or the alunite concentrate in the presence of KCl, or NaCl, or a mixture of both.
(c) The reclamation of the produced HCl in this reaction in (b).
(d) The treatment of the residue of the products of calcination by hot water for the removal, collection and crystallization of $K_2SO_4$.
(e) The dissolution of the remaining impure alumina by the produced dilute HCl or by a more concentrated acid made from a mixture of the originally reclaimed dilute acid (step c) and the concentrated HCl resulting from the conversion of $AlCl_3$ into $Al_2O_3$ (step g) when a concentrated solution of $AlCl_3$ is produced, pure $SiO_2$ remaining as a residue free of any oxide contaminants with the exception of $TiO_2$.
(f) The purification of $AlCl_3$ by standard techniques (mainly by a suitable method of crystallization).
(g) The conversion of $AlCl_3$ to pure alumina by calcination and the reclamation of concentrated HCl.
(h) Mixing of the above concentrated HCl with the dilute HCl produced by reaction (II) for the preparation of HCl of adequate strength necessary for the complete dissolution of the impure alunina.
(i) The reclamation of $TiO_2$ from $SiO_2$ by known methods of concentration.

I claim:
1. A method of producing purified alumina from impure alunite consisting of:
(a) calcinating the impure alunite in the presence of a chloride selected from the group consisting of potassium chloride, sodium chloride, and mixtures thereof at a temperature of between about 500° C. to 590° C. to form impure alumina ($Al_2O_3$), sulfates, dilute HCl, and other byproducts;
(b) removing the produced sulfates from the calcination products of (a) by extraction with hot water;
(c) contacting the impure alumina produced in (a) with HCl having a concentration of 30% or more and at a temperature of between room temperature and about 100° C. to produce an aqueous solution of aluminum chloride;
(d) recovering the aluminum chloride from the solution of (c) by concentrating to produce crystals of $AlCl_3 \times 6H_2O$; and

(e) calcinating the aluminum chloride from (d) to yield pure alumina and concentrated HCl.

2. The method of claim 1, wherein the HCl of step (c) is formed by mixing the dilute HCl formed in step (a) with the concentrated HCl formed in step (e).

3. The method of claim 1, wherein the chlorides of step (a) consist of a mixture of potassium chloride and sodium chloride and wherein the relative ratio thereof is 99:1 to 99:10.

4. The method of claim 3, wherein the sulfates of step (b) include $K_2SO_4$ and $Na_2SO_4$.

5. The method of claim 1, wherein the alunite contains silicate compounds, wherein the reaction products of step (a) include $Al_2Si_2O_7$, and wherein the HCl of step (c) reacts therewith to form $AlCl_3$ by the reaction sequence $$Al_2Si_2O_7 + 6HCl \rightarrow 2AlCl_3 + 2SiO_2 + 3H_2O.$$

6. The method of claim 5, wherein the $SiO_2$ produced contains $TiO_2$ impurities which are recovered.

7. The method of claim 1 wherein said HCl is contacted in step (c) with the impure alumina at a temperature of about 100° C.

* * * * *